United States Patent Office 3,179,606
Patented Apr. 20, 1965

3,179,606
CELLULAR POLYURETHANE PLASTIC MATERIAL WITH RAPID HIGH STRENGTH
Wesley E. Prescott and Stephen P. Edwards, Lake Jackson, Tex., assignors to The Dow Chemical Company, Midland, Mich., a corporation of Delaware
No Drawing. Filed Dec. 19, 1960, Ser. No. 76,453
5 Claims. (Cl. 260—2.5)

This invention relates to cellular plastic materials. More specifically it relates to cellular polyether-type polyurethane materials which, during their preparation, rapidly attain high-strength and which have a low foam density and high elongation at break.

The expression "high-strength," as used hereinafter, means the strength or dimensional stability of the cellular material, during preparation, as soon as the expanding mass attains maximum rise. High-strength is usually measured by pressing on the expanded cellular mass with an object such as a wooden tongue depressor or the like and if the cellular material compresses and returns, it has attained high-strength. However, if part of the cellular material sticks to the object much as meringue-type cake icing sticks to a knife, then the expanded mass has not attained high-strength. High-strength is reported as the time elapsed until the expanded mass has high-strength and for the presently known art, this is from about 10 and 30 minutes.

Urethane cellular materials most often are prepared commercially from either polyester or polyether-type polyoxy alkylene polyols, diisocyanates, and water with the mechanical characteristics of the cellular material depending largely upon the choice of the polyoxy alkylene polyol. In addition to these major ingredients, other agents such as catalysts, emulsifiers, cell-size regulators, and anti-shrink agents may be used in the formulation.

In the preparation of flexible polyether-type cellular materials, the ingredients are mixed together and allowed to expand. When the cellular material attains its maximum rise height, it is allowed to stand 10 to 30 minutes since, depending upon the formulation, that period of time is necessary in order for the cellular material to attain high-strength. When the cellular material has attained dimensional stability, it is mechanically crushed, as for example, by passing it between two rollers. The crushing step eliminates closed cells and aids in preventing shrinkage. However, since the cellular material cannot be crushed until it reaches a degree of dimensional stability that enables it to return to its original cellular shape, the process is slowed down at this step.

We have discovered that when a minor proportion of a polyamine of a polyglycol is incorporated in the formulation of flexible foams from polyoxy alkylene polyol, diisocyanate, and water, the foam thus produced has a rapid development of high-strength whereby the production process may be greatly accelerated.

Hereinafter, the term "polyoxy alkylene polyol" will mean a polyether-type polyglycol and the term "foam" will mean a cellular material.

The polyoxy alkylene polyols, having the basic unit —O—R—O— are those polyols having a molecular weight in the range of from about 1000 to 5000. These polyols are well known to the art and are such compounds as:

HO—(R—O)$_x$—R—OH, wherein R is 2, 3, or 4 carbon atoms and the R's may be alike or different, and $x$ is an integer from 12 to 160;

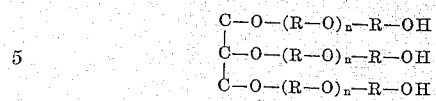

wherein R is 2, 3, or 4 carbon atoms and the R's may be alike or different and $n$ is an integer from 3 to 40: and

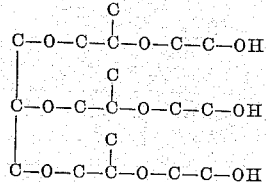

polyols of the type

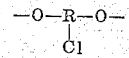

wherein R is as above will not work.

The amount of polyols may be in the range of from 50% to 80% of the foam formulation.

The polyamine compounds useful in the present invention are those having from 2 to 10 amino groups per molecule and may be prepared by adding ammonia or the desired amine, such as diethylenetriamine, triethylenetetramine, tetraethylenepentamine, and the like, to a polyglycol to convert the —OH groups to the amino group. The polyamines have the formula

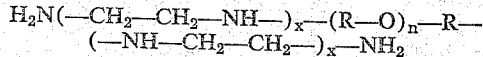

wherein R is an alkylene radical containing from 2 to 4 carbon atoms, $x$ is an integer from 0 to 4 and $n$ is an integer such that the polyglycol starting material used to prepare the polyamide compound has an average molecular weight of from about 400 to about 2000. The amount of polyamine employed is in the range of from .02 to 50 weight percent based on the amount of polyglycol.

The preferred polyisocyanates are the toluene diisocyanates but, in general, any of the polyisocyanates which are liquid at room temperature are advantageously employed. Representative examples are hexamethylene diisocyanate; paraphenylene diisocyanate, meta-phenylene diisocyanate; 4,4'-diphenyl diisocyanate; 4,4'-diphenyl ether diisocyanate; 4,4',4''-triphenyl triisocyanate, and 3,3'-dimethoxy 4,4'-diphenyl diisocyanate.

Anti-shrink agents such as Cab-O-Sil and dispersing and cell size regulators such as X-520 may be employed in amounts up to 5 weight percent as desired. Catalysts mixtures such as dibutyl tin dilaurate, triethylenediamine, N-ethyl morpholine, and water may be used in the range of 1 to 7 weight percent.

The present invention may be further understood by reference to the following illustrative examples.

EXAMPLE 1

2.6 grams of Cab-O-Sil, an expanded silicate anti-shrink agent, and 10.6 grams (4.9%) of P-400 diamine (the product prepared by adding propylene oxide to propylene glycol until the resulting product has a molecular weight of approximately 400 and then adding ammonia to convert the —OH groups to —NH$_2$ groups) were stirred into 216.0 grams of polyglycol 11-200 which was prepared by adding propylene oxide to a glycerine nucleus until the resulting product has a molecular weight of approximately 2700. A catalyst solution consisting of 0.9 gram triethylene diamine, 1.8 grams of a water soluble organo-silicone copolymer as described in U.S. Patent No. 2,834,748, which functions as a dispersing agent and cell size regulator, and 7.7 grams of water was added and the mixture stirred for 3 seconds. 118.0 grams of toluene diisocyanate was then added, the mixture stirred for 3 seconds and poured into an 8 x 8 x 20 inch cardboard box. The foam rose to its maximum height in 38 seconds and at the end of 2 minutes could not be punctured with a wooden tongue depressor. After curing in an air circulating oven for 3 hours at 120° C. the foam had the physical properties set forth in the following Table I after "Example 1."

EXAMPLE 2

In a manner similar to that of Example 1 a polyurethane foam was prepared from the following ingredients.

| | Grams |
|---|---|
| Polyglycol P-2000 [1] | 270.0 |
| P-400 diamine | [2] 6.5 |
| Triethylene diamine | 0.9 |
| Water soluble silicone copolymer | 1.8 |
| Water | 7.7 |
| Toluene diisocyanate | 118.0 |

[1] Polyglycol P-2000 is prepared by adding propylene oxide to a propylene glycol nucleus until the resulting product has a molecular weight of about 2000.
[2] 2.4%.

This foam reached its high strength in 3 minutes. The physical properties are set forth in Table I.

EXAMPLE 3

Following the procedure of the above examples a polyurethane foam was prepared from the following ingredients:

| | Grams |
|---|---|
| Polyglycol 112-3 [1] | 219.0 |
| P-400 diamine | [2] 7.9 |
| Triethylene diamine | 0.36 |
| Water soluble silicone copolymer | 1.8 |
| Water | 7.7 |
| Toluene diisocyanate | 118.0 |

[1] Polyglycol 112-3 is prepared by adding a mixture of propylene oxide and ethylene oxide to a glycerine nucleus until the resulting product has a molecular weight of about 3100.
[2] 3.6%.

This foam reached its high strength in 3 minutes.

EXAMPLE 4

A polyurethane foam was prepared as in the above examples using the following ingredients:

| | Grams |
|---|---|
| Polyglycol 11-200 | 270.0 |
| P-400 bis(diethylenetriamine) | [1] 0.14 |
| Triethylene diamine | 0.9 |
| Water soluble organo-silicone copolymer | 1.8 |
| Water | 7.7 |
| Toluene diisocyanate | 118.0 |

[1] 0.05%.

The foam reached its high strength in 3 minutes. In contrast, when this example was repeated omitting the P-400 bis(diethylenetriamine) the time required to reach high strength was 12 minutes.

EXAMPLE 5

The experiment of Example 4 was repeated except B-500 bis(diethylenetriamine), prepared by reacting a polybutylene glycol having a molecular weight of 500 with diethylenetriamine (DETA) and thereby placing a DETA unit on each end, was substituted for the P-400 bis(diethylenetriamine). The time required for the foam to reach high strength was 3 minutes.

EXAMPLE 6

Following the procedure of the above examples a polyurethane foam was prepared from the following ingredients:

| | Grams |
|---|---|
| Polyglycol 112-3 | 211.0 |
| P-2000 diamine | [1] 92.7 |
| Triethylene diamine | 0.36 |
| Water soluble organo-silicone copolymer | 1.8 |
| Water | 7.7 |
| Toluene diisocyanate | 118.0 |

[1] 47.3%.

The physical properties of the foams prepared in Examples 1 through 6 are summarized in the following table.

Table I

| Physical Property | Example 1 | Example 2 | Example 3 | Example 4 | Example 5 | Example 6 |
|---|---|---|---|---|---|---|
| Density, #/cu. ft | 1.9 | 2.5 | 2.0 | 2.5 | 2.0 | 2.4 |
| Tensile, p.s.i. | 14.7 | 23.1 | 17.0 | 14.0 | 14.4 | 11.9 |
| Elongation at break, percent | 200 | 420 | 190 | 130 | 200 | 150 |
| Compression set ASTM (B), percent | 40 | 22 | 26 | 8 | 10 | 20 |
| Compression set ASTM (B) after aging,[1] percent | 32 | 24 | 26 | 14 | 10 | 20 |
| Compression load at 25% Deflection, p.s.i. | 0.42 | 0.40 | 0.70 | 0.65 | 0.60 | 0.85 |
| Compression load at 25% Deflection after aging [1] (p.s.i.) | 0.50 | 0.40 | 0.44 | 0.58 | 0.58 | 0.45 |
| Yerzley Resilience, percent | 34 | 49 | 25 | 55 | 29 | 44 |
| Yerzley Resilience after aging,[1] percent | 22 | 53 | 21 | 47 | 30 | 24 |

[1] Aging 3 hours at 220° F. and 100% relative humidity.

We claim:

1. A cellular polyurethane product prepared from a foamable composition comprising a major proportion of a polyoxyalkylene polyol, from 80 to 130% of the polyol equivalent of an organic diisocyanate, from 1 to 7 weight percent of a catalyst mixture and from 0.02 to 50.0 weight percent of a polyamine having the formula $$H_2N-(-CH_2-CH_2-NH-)_x-(R-O)_n$$
$$-R-(-HN-CH_2-CH_2-)_x-NH_2$$

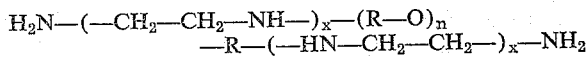

wherein R is an alkylene radical containing from 2 to 4 carbon atoms, $x$ is an integer from 0 to 4 and $n$ is an integer such that the polyglycol starting material used to prepare the polyamine has an average molecular weight of from about 400 to 2000.

2. Composition of claim 1 wherein the polyamine is a polyamine of a polypropylene glycol having an average molecular weight between 400 and 2000.

3. Composition of claim 2 wherein the polyamine is a polyamine of a polypropylene glycol of about 400 average molecular weight.

4. Composition of claim 2 wherein the polyamine is the diamine of a polypropylene glycol having an average molecular weight of about 2000.

5. The method of producing rapid high strength polyurethane foams comprising incorporating in a foamable polyurethane formulation comprising a polyoxyalkylene polyol, an organic diisocyanate and catalyst, from 0.02 to 50.0 weight percent, based on said polyol, of a polyamine having the formula $$H_2N-(-CH_2-CH_2-NH-)_x-(R-O)_n-R-(-HN-CH_2-CH_2-)_x-NH_2$$

wherein R is an alkylene radical containing from 2 to 4 carbon atoms, $x$ is an integer from 0 to 4 and $n$ is an integer such that the polyglycol starting material used to prepare the polyamine compound has an average molecular weight of from about 400 to 2000, and allowing the mixture to foam.

References Cited by the Examiner
UNITED STATES PATENTS

| | | | |
|---|---|---|---|
| 2,953,533 | 9/60 | Khawam | 260—2.5 |
| 2,955,056 | 10/60 | Knox | 260—2.5 |

LEON J. BERCOVITZ, *Primary Examiner.*

UNITED STATES PATENT OFFICE
CERTIFICATE OF CORRECTION

Patent No. 3,179,606    April 20, 1965

Wesley E. Prescott et al.

It is hereby certified that error appears in the above numbered patent requiring correction and that the said Letters Patent should read as corrected below.

Column 2, line 37, for "polyamide" read -- polyamine --; column 4, line 21, for "P-2000 diamine" read -- *P-2000 diamine --; same column 4, line 27, under "147.3%" insert the following:
*Polypropylene glycol, molecular weight 2000, diamine.
The time required for the foam to reach high strength was 7 minutes.

Signed and sealed this 26th day of October 1965.

(SEAL)
Attest:

ERNEST W. SWIDER
Attesting Officer

EDWARD J. BRENNER
Commissioner of Patents